United States Patent [19]

Bergquist

[11] Patent Number: 4,717,966
[45] Date of Patent: Jan. 5, 1988

[54] DEVICE FOR LONG-DISTANCE TRANSMISSION OF IMAGES

[75] Inventor: Folke Bergquist, Hindås, Sweden

[73] Assignee: Victor Hasselblad AB, Göteborg, Sweden

[21] Appl. No.: 905,348

[22] Filed: Sep. 10, 1986

[30] Foreign Application Priority Data

Sep. 10, 1985 [SE] Sweden .............................. 8504181

[51] Int. Cl.⁴ .............................................. H04N 1/32
[52] U.S. Cl. ................................................ 358/286
[58] Field of Search ................. 358/285, 286, 293, 294

[56] References Cited

U.S. PATENT DOCUMENTS 4,620,233 10/1986 Ogawa ................................. 358/286

Primary Examiner—Tommy P. Chin

[57] ABSTRACT

A device for long-distance transmission of images includes a transmitter and a receiver, connected by a communications line. The transmitter contains a device which scans a picture in a linear pattern to form an electric signal modulated to represent the brightness of the picture in picture points along the scanned lines. The receiver has a picture reproduction device and a driver for moving the reproduction device relative to a picture-supporting surface in a linear pattern corresponding to the linear scanning pattern of the transmitter. Upon receiving this signal the picture points are reproduced line by line with a brightness which corresponds to the modulation of the electric signal. The transmitter contains a memory and a controller arranged to divide the transmission of the signal created by the scanning device into segments and, upon sensing a maneuver signal, to direct the memory to retransmit a portion of the signal corresponding to one segment to the receiver. The receiver is provided with a memory and a control unit arranged to verify each signal segment received via the communications line with respect to errors while simultaneously storing each signal segment in the memory. If a preselected level of error has not been exceeded, the signal segment is transferred from the memory to the picture reproduction device. If this error level has been exceeded the aforementioned maneuver signal is sent to the transmitter to direct it to retransmit the erroneous signal segment and the erroneous signal segment, store in the receiver's memory, is erased.

5 Claims, 5 Drawing Figures

DEVICE FOR LONG-DISTANCE TRANSMISSION OF IMAGES

TECHNICAL FIELD

The present invention relates to a device for the long-distance transmission of images such as a picture, such longdistance transmission being effected by means of a transmitter and a receiver connected by means of a communications line such as a conductor or a wireless connection, the transmitter containing a scanning means for scanning an image in a linear pattern and deviced so as to form an electric signal modulated to represent the picture's brightness in picture points along the scanned lines, the receiver having a reproduction means and a moving means for moving of same relative to a picture supporting surface in a linear pattern corresponding to the transmitter's linear pattern, means for receiving said signal via the communications line and tranferral of same to the picture reproduction means which is so arranged that, in the course of its motion over said surface, it reproduces the picture points line by line with a brightness which corresponds to the modulation of the signal.

BACKGROUND

The longdistance transmission of images is undertaken for different purposes. Two main purposes can be distinguished: the transmission of monochrome or color images with high transmission quality for reproduction in newspapers and magazines as the most important application, and the transmission of images and texts, often black and white in nature, for informative reasons, without high requirements for accurate reproduction and which has as its main object the transmission of documents in an office environment. The invention relates to apparatuses for the former purpose, which, however, does not prevent its possible use in the other main area if the quality which can be achieved by the invention is required even in this area. The following presentation will, however, mainly concentrate on apparatuses for the former purpose, i.e., apparatuses for the transmission of images. In the following it is assumed, for purposes of example only, that the image involved is a picture.

Previously known apparatuses of this type transmit a picture in a continuous synchronized fashion. The picture is scanned line by line in the transmitter and its varying levels of brightness give rise to a transmitted signal by means of lightsensitive elements. During the continuous scanning of the picture the signal is transmitted to the receiver via a telephone line, some other line, or wirelessly. The surface, normally a paper surface, on which the picture is to be created is scanned in the receiver in synchronization with the scanning of the original picture and a printing means gives the surface the blackening or the nuance of color which corresponds to the signal which is transmitted at that instant. Previously, an analog signal was used for the gray scale, but now a digital signal is widely used which lends good fidelity to the reproduction. Precise equipment is used for synchronization so that satisfactory agreement can generally be attained between the original and the reproduction.

Technical problem

When it comes to quality of transmission, however, one difficulty remains. Disturbances in the transmission link can distort the received signal so much that the reproduction of the picture becomes inaccurate. In general, the inaccuracies affect the reproduction of the gray scale such that a line is rendered lighter, darker, longer or shorter than was intended. Even the synchronization can be affected if, for example, the sync pulse disappears or is delayed, which can result in an almost total distortion of the picture. Prior methods provide a certain ability to make corrections if errors are detected in the received signal, but systems of prior art have not been suitable for high quality transmission of, for example, photographs.

The solution

A solution to the described problem is according to the invention, obtained by that the transmitter contains a memory and a control means arranged in part to divide the transmission via the communication line of the signal created by means of the scanning means into time intervals, each containing a specific picture segment, preferably consisting of a line, and partly, in the presence of a maneuver signal, to direct the memory to retransmit a portion of the signal to the receiver and that the receiver is designed with a memory and a control unit arranged so as to verify each signal section received via the communications line with respect to errors while simultaneously storing same in the memory and arranged so as to, while verifying that a preselected level of error has not been exceeded, transfer the signal section from the memory to the reproduction means for reproduction of a picture segment corresponding to said signal section and, when detecting that said error level has been exceeded, to send via the communications line, which is two-way, said maneuver signal to the receiver causing the destruction of the erroneous signal section stored in the receiver's memory as well as thereafter verifying the retransmitted signal section until such time as a signal is received which has a level of error less than the predetermined value, whereupon the control means transfers same to the reproduction means in order to reproduce a picture segment which corresponds to the signal section.

Advantages

The purpose of the present invention is to provide a device for longdistance transmission which makes possible a continuous check of the transmitted signal in such a manner that corrections can be made in individual portions of the signal before they are used to direct the printing means. In this way a faultless picture is produced even when disturbances arise at the moment of transmission.

Another purpose of the invention is to provide a device which is independent of the particular rate of synchronization used for transmission between a transmitter and a receiver. In this manner a transmission rate can be chosen to correspond to the proper transmission capacity for all types of connections and may even be chosen during the course of a transmission.

BRIEF DESCRIPTION OF DRAWINGS

One embodiment of the invention will now be described with reference to the accompanying drawings.

BEST MODE OF CARRYING OUT THE INVENTION

Figure 1:
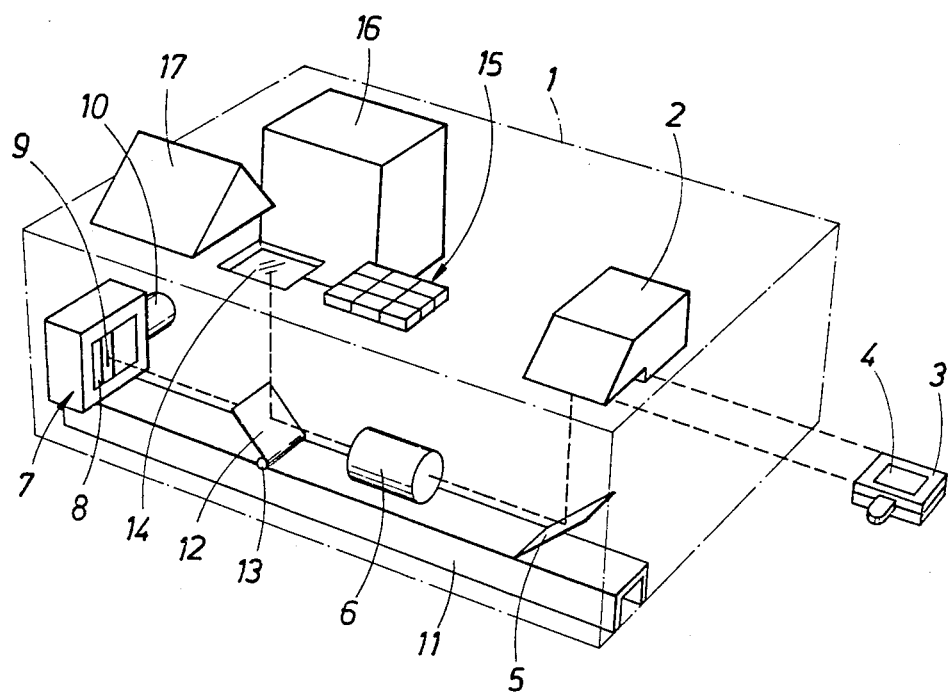
FIG. 1 is a perspective view of a transmitter of the type for which the invention can be applied.

An apparatus for sending picture information of the type for which the invention can be used is shown in FIG. 1. It comprises a casing 1, illumination means 2, a container 3 for the film 4 which is maneuverable in the beam path of the illumination means, as well as a first mirror 5 on a supporting beam 11, a lens system 6 providing variable magnification and a device 7 for scanning pictures.

The scanning device 7 contains a row scanner 9, which can, for example, be of the type CCD and which is connected to a movable slide 8. Using a motor 10, the slide is movable in the longitudinal direction of the row scanner 9 by known means, so that a row by row scanning can be accomplished of the picture projected onto the device 7 from the film 4 via the mirror 5 and the lens system 6.

A second mirror 12, which is connected to an axel 13, and which is rotatable between two positions, is positioned in the beam path in the direction of the scanning device 7. When the mirror 12 assumes the position shown in the figure, the projection is reflected from the lens system upwards to a focusing screen 14 on which it is possible to observe the projected picture. By observing the picture which appears on the focusing screen 14 it is possible to focus and the section of the picture which is most pertinent may be selected. When the picture section is chosen the mirror 12 is dropped so that the scanning device may read the picture whereby keyboard 15 can be used for maneuvering. The sender is equipped with a monitor 17 in order to allow checking of the scanned picture which is stored electronically in a memory 16.

Figure 2:
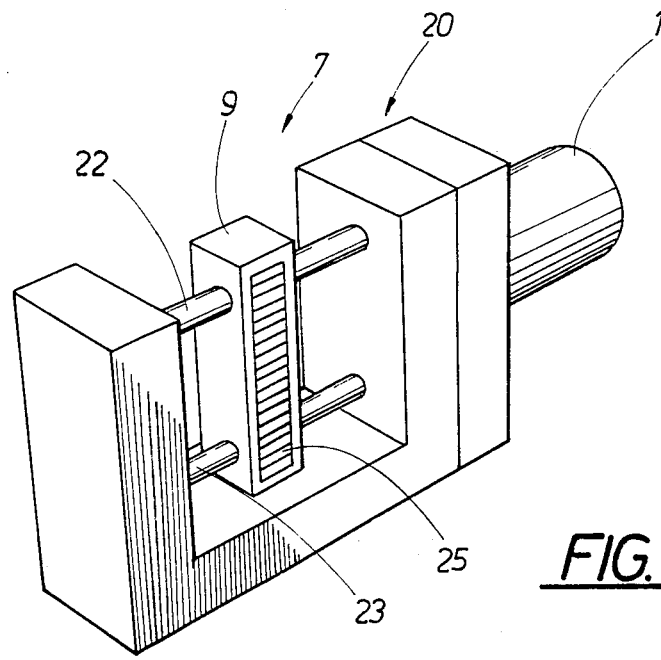
FIG. 2 is a perspective view of a device for scanning a picture, a so-called "scanner"

FIG. 2 shows the picture scanning device 7 which is contained in the transmitter, shown in FIG. 1. It comprises a frame 20 with two guides 22 and 23 along which a scanning element, the aforementioned row scanner 9, can be moved. The guides 22 and 23 can, for example, consist of worm gears which are driven by electric motor 10 in the frame 20 so that the row scanner is moved back and forth along the guides in a direction determined by the direction of rotation of the worm gears. The row scanner is equipped with a row of photo sensors 25, sufficient in number to ensure high resolution. The photo sensors are shielded in the scanner's transverse direction in such a manner that they are only affected by a narrow band which extends perpendicular to the element's direction of movement. The plane of the photo sensor lies in the focal plane of the said projection of the picture which is to be sent.

Figure 3:
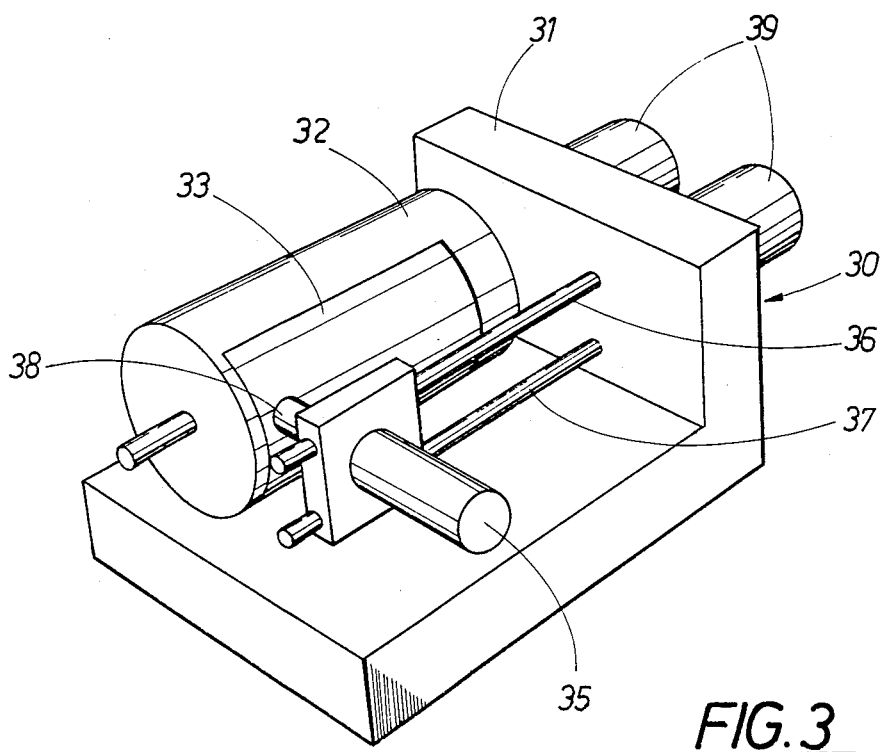
FIG. 3 is a perspective view of a device for reproduction of a picture in the picture receiver.

FIG. 3 shows an example of a picture reproduction device found in the receiver. Said device includes a supporting frame 31 in which a cylinder drum 32 is mounted in bearings and is arranged for mounting a picture medium such a photographic paper or photographic film 33. Along the drum 32 is provided an illumination device 35 which is movable along the guides 36 and 37. It contains an optical device 38, directed towards the drum 32, which focuses the light from the light source to a fine point on the surface of the paper/film 33. Motors 39 for moving the illumination device along the guides 36 and for turning the drum 32 are arranged on the frame 31 and are connected to controlling equipment. For the sake of clarity only a section of the frame has been shown. The light source in the illumination device 35 is arranged so as to receive signals from the transmitter and to modulate its light strength in accordance therewith.

The photo sensors of the row scanner 9 are connected to the electronic equipment of the transmitter in such a manner that they produce a pulse, the level of which is dependent upon the strength of the light which at the instant of registration affects each respective photo sensor.

Figure 4:
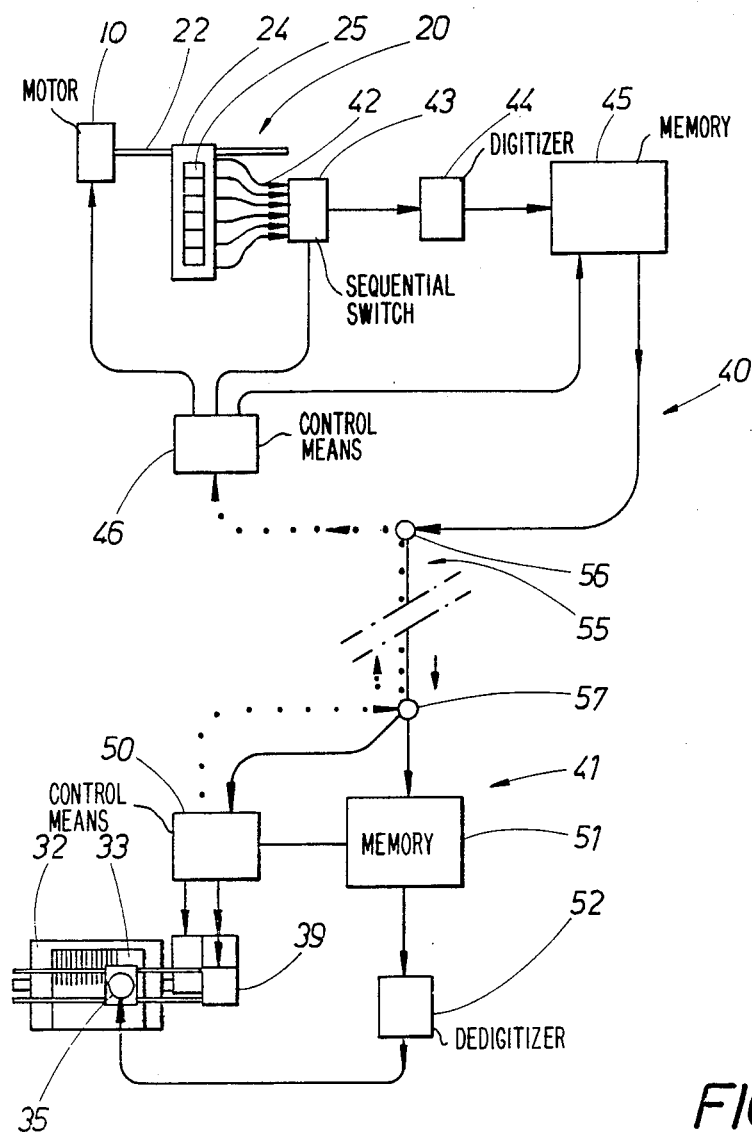
FIG. 4 is a schematic block diagram of the electronic equipment found in the transmitter and in the receiver.

FIG. 4 shows a schematic diagram of the transmitter and the receiver. In the figure, the transmitter is indicated as 40 and the receiver as 41. The scanning device 7 with its row scanner 9 and with the photo sensors 25 (Only four such are shown.) are recognized in the transmitter. By means of said motor 10 the scanner may be moved along the guide 22.

As has been mentioned, the photo sensors can be actuated one at a time so as to produce a sequence of pulses such that a pulse train is created which represents the varying degree of illumination along a line of the picture which is to be transmitted. This arrangement is symbolized by a number of conductors 42 and a sequential switch 43 for creating said pulse train. This pulse train then passes to a digitizer 44 which converts the analog signals, which correspond to the illumination, to numerical values. The digital signal then passes to a memory 45. The transmitter also contains a control means 46 which is arranged so as to control the scanning of the picture by sequentially activating the photo sensors 25 in order to scan a line of the picture and to move the row scanner 9 by means of the motor in the housing 21.

The receiver 41 contains the drum 32 described above with the picture medium 33 as well as the illumination device 35 and the motor unit 39 for turning the drum 32 and moving the illumination device 35 along same. A control means 50 is provided for controlling the motor unit 39. A memory 51 is provided for receiving the signal supplied by the transmitter. The signal retrieved from the memory can be converted back into analog form in a dedigitizer 52 and is passed on to the illumination device 35 for modulating its light strength.

The line of communication between the transmitter and the receiver is designated by 55. The digitized signal from the transmitter's memory 45 is transferred via a modem 56 over said line of communication and via a modem 57 to the receiver's memory 51. The received signal is also transformed as is shown in the figure and is passed to the control unit 50. Additionally, the line 55 is arranged to allow transferral of answer signals from the receiver's control unit 50 to the transmitter's control unit 46. The answer signals' path is shown as a dotted line in the figure whereas other signals are shown as solid lines.

The arrangement of the control units 46 and 50, their mutual cooperation and their cooperation with the device for picture scanning and the device for picture reproduction is essential to the invention. The control means 46 is arranged so as to bring about a continuous scanning of the picture which is to be transmitted by means of sequential transferral of signals from the row of photo sensors 25 and movement of the scanning unit 24 so that the picture is scanned successively, line by line.

The control means 46, however, is also arranged so as to be able to interrupt this continuous scanning of the picture and await a new transmission to the receiver of the most recently sent picture segment. The picture is thereby divided into a number of picture segments, which can consist of a single line corresponding to the scanning of one row of the row scanner's 9 photo sensors 25, or preferably a number of such lines, limited, however, in number, so that the picture segment in question uses only a small portion of the transmission time which is required for transmitting an entire picture. The arrangement shown in FIG. 4 assumes that the signal for each such picture segment is applied to the memory 45 in digitized form. The memory must consequently have sufficient capacity to contain one such picture segment.

Additionally, the control means 46 is arranged so that the scan rate, i.e. the period of time required to transfer the sequence of digital signals from the row of photo sensors 25, can be changed from transmission to transmission and can even be changed during transmission.

The control means 50 in the receiver 41 is, on the other hand, arranged for continuous registration of the transmitted picture onto the picture medium 33. This is accomplished by rotating the drum 32 so that the picture medium 33 passes under the illumination device 35 during the time that a pulse train is received which corresponds to the signals from the photo sensors 25 in the row scanner 9, i.e. during the scanning of a line of the picture, so that a corresponding line is created on the picture medium. For each such rotational movement of the drum, during which a line is formed, the illumination device 35 is moved one line step so that a new line may be created immediately adjacent to the previous line.

The control means 50 is, however, also arranged so as to be able to interrupt this continuous registration of the picture. This interruption is contingent upon a check of the received signal which, as is shown in FIG. 4, is presented to the control means 50 as well as to the memory 51. Said check is of whether or not the signal has been transferred correctly from the transmitter and thus constitutes a check for errors. One such error check may be accomplished by analyzing the received digital signal and examining it for possible deviations from the known structure of a correct digital signal. If an error is detected during reception of a picture segment the control means 50 prevents the received signal from being passed on from the memory 51 to the picture reproduction device which, simultaneously, is halted. At the same time a signal is sent via the communication line 55 to the transmitter's control unit 46 which is so arranged that it then interrupts the scanning of the picture as has been described above. The capacity of the memory 51 is also chosen so as to correspond to at least one of said picture segments.

The transmission means of the receiver is consequently arranged so as to convey the signal corresponding to a picture segment from the memory onwards to the picture reproduction device in order to modulate its illumination device only after the signal for the picture segment has been registered as being error-free. If this is not the case, picture reproduction is interrupted and the picture reproduction device delays reproduction of the picture segment in question until the control device indicates that a new error-free signal has been registered in memory whereupon picture reproduction continues. As long as the signal is error-free picture reproduction can be continuous.

Furthermore, the control unit 50 is devised so as to vary the circumferential velocity of the drum 32 under the illumination means 35 in accordance with the pulse rate of the received transmission signal. Since this signal is digitized it consists of a sequence of numbers each of which corresponds to the instantaneous illumination sensed by one of the photo sensor. Each such number corresponds to a particular segment of the line which is scanned by means of the row scanner 9 and to the corresponding segment of the line which is reproduced in the picture reproduction device. For each line, the concatenation of the line segments corresponding to the number sequence must form a line, the length of which corresponds to the length of the line produced in the picture reproduction device. Were this line to be too long or too short the dimension of the picture in the longitudinal direction of the lines would be changed in relation to the unchanging dimension in the direction transverse the lines which corresponds to the number of lines and their relative separation. If the transmission rate is reduced the numbers will be sent with larger time intervals than they would be at a higher transmission rate. This is registered by the control unit 46 which is arranged in such a manner that it regulates the circumferential velocity of the drum so that the set number of line segments which correspond to a scanned line always have the proper length in relation to the distance in the lines' transverse direction.

Alternatively, the receiver can be designed so that it only receives and stores the correct digital picture information. At the discretion of an operator the picture can thereupon be output using different output means. One such output means could be a conventional telephoto receiver which, however, requires synchronous picture transmission. In this case, the advantage of the invention is that the synchronous transmission, using artificially created synchronization pulses, takes place over a much shorter and higher quality line which leads to a minimum of disturbances and consequently higher picture quality than is attained using conventional telephoto transmissions.

The manner in which a signal is transferred will now be described with reference to FIGS. 4 and 5. The way in which a signal is formed in a transmitter's scanning device has been described above. As has been mentioned, scanning takes place in such a way that the portions of the signal corresponding to a segment of the picture to be transmitted, are conveyed to the memory 45 and then onwards to the receiver 41 via the communication line 55. Within the receiver 41 each such signal portion is stored in the memory 51 while the control unit 50 carries out a check of the correctness of the signal as has been described above. When a signal portion, which corresponds to a segment of the picture has been established as being correct by the control unit 50 the memory 51 is activated so as to convey the signal further so that, having been converted to analog form, it may regulate the modulation of the illumination device 35. Simultaneously, the control unit 50 causes the picture medium 33 to be moved using the motor device 39.

If, however, the signal is not established as being correct by the control unit 50, storage in the memory 51 is interrupted and a signal is sent via the communication line 55 from the control unit 50 to the control unit 46 (see the signal path shown as a dotted line in FIG. 4).

The control unit 46 then causes the scanning of the row scanner 9 to be halted. The signal transmission from the memory 45 of the signal corresponding to the picture segment in question is halted and is restarted from beginning. If the signal for the entire section is established as being correct by the receiver's control unit 50 the segment in question can be registered in the receiver.

Figure 5:
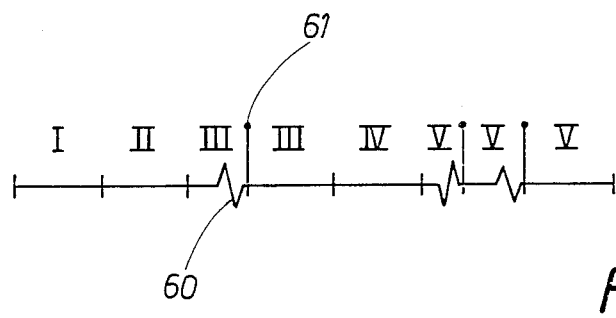
FIG. 5 illustrates the nature of a transmission signal.

This procedure is clarified in FIG. 5. The signal is shown schematically as a horizontal line. A first signal section designated by I has been received correctly and, consequently, causes no repeat transmission. This is also the case for signal section II. In regard to signal section III, a disturbance has arisen during reception of this signal section which is indicated by a curve. The vertical line indicates that the transmission is halted at this point under the direction of the receiver's control unit 50. The signal section in question is thereupon retransmitted from the memory 45 to the memory 51. The region of the memory 51 which contained the previous erroneous information has been erased. As the figure shows, the retransmitted signal is then received correctly. The same is the case for signal section IV. Signal section V, however, is affected by disturbances and is interrupted whereupon the signal is retransmitted, resulting in yet another interruption. Finally, on the third attempt, the signal is received correctly. This is an example of how a signal sequence might occur.

The device may be designed in different ways without departing from the spirit of the invention and all such designs are considered to lie within the scope of the following patent claims. Certain alternatives have already been mentioned in the preceding text. As regards the memories 45 and 51, these can be limited to a memory capacity corresponding to one picture segment. In this case each picture segment must be erased after establishing error-free reception so that the next picture segment may be stored. Alternatively, the memory can have greater capacity and, as has been mentioned previously, the receiver can utilize a memory with sufficient capacity to store the entire picture, or several pictures, for reproduction of the picture at a later opportunity. Within the scope of the invention it is also envisaged that the device may function even if the signal is not digitized; digitization, however, facilitates detection of errors in transmission.

The design of the scanning device as well as of the picture reproduction device may vary greatly. For example, the transmitter could be constructed using a rotating drum instead of a row scanner. Conversely, the receiver can be designed for picture reproduction using a reciprocating procedure such as is used to generate a television picture. The reproduction means do not, of course, have to rely on a light source which exposes a photographic medium. Other means, such as, for example, an ink jet, could also be utilized. As has been pointed out, utilization of the device for transmission of color pictures also lies within the scope of the invention. In this case the transmission is generally divided into three parts in accordance with a color analysis and decomposition of the picture into the three basic colors of the color circle. The manner in which this is done is, however, well known, requiring no further description and, a person skilled in the art could also use the invention for transmission of color pictures based solely on the information which has been supplied above.

I claim:

1. A device for long-distance transmission of images including a transmitter;
a receiver;
a bidirectional communications line connecting the transmitter and the receiver;
scanning means, included in the transmitter, including an array of photosensitive elements;
scan drive means, included in the transmitter, for moving the array of photosensitive elements linearly and immediately adjacent to the surface of a picture for scanning the picture as a sequence of scan lines, each scan line consisting of a series of adjacent picture points, whereupon each photosensitive element produces a first analog electric signal corresponding to the incident light from the picture point to which it is immediately adjacent;
analog-to-digital conversion means, included in the transmitter, converting each first analog electric signal to a corresponding digital data signal;
a sequential switch, provided to sequentially place the photosensitive elements in electrical contact with the analog-to-digital conversion means;
transmission means for transmitting data blocks via the communications line;
receiving means for receiving the data blocks;
a supporting surface provided to support a printing surface on which a fascimile of the picture is to be produced;
digital-to-analog conversion means, included in the receiver, converting each data block to a corresponding second analog electric signal; picture reproduction means, included in the receiver, including a printing element for printing patterns on the printing surface corresponding to the second analog electric signals;
print drive means for moving the printing element linearly over the printing surface for printing a reproduction of the picture as a sequence of print lines, each print line consisting of a series of adjacent printing points, said print lines corresponding to said scan lines and said printing points corresponding to said picture points;
characterized by comprising:
first memory means in the transmitter, provided for temporarily storing said data blocks,
first control means in the transmitter, connected to the scanning means, to the sequential switch, to the first memory means and to the communications line and provided to group the digital data signals into said data blocks, each data block preferably corresponding to one scan line, to transfer said data blocks from the first memory means to the transmission means for transmission via the communications line, to sense a retransmission signal and, upon sensing said retransmission signal, to direct the first memory means and the transmission means to retransmit to the receiver the data block, temporarily stored in the first memory means, which was most recently transmitted to the receiver;
second memory means, included in the receiver, provided for temporarily storing the received data blocks;
second control means, included in the receiver, connected to the picture reproduction means, to the second memory means, to the digital-to-analog conversion means and to the communications line and provided to detect errors in the received data blocks and, upon the detection of an error, to generate said retransmission signal and, if no error is detected, to transfer the received data blocks stored in the second memory means to the picture reproduction means via said digital-to-analog conversion means.

2. A device according to claim 1, wherein the first memory means and the second memory means each have a storage capacity corresponding to one said data block, the first control means is provided to stop the motion of the scanning means, thereby stopping the scanning of the picture, until a confirmation signal is received from the second control means and, upon receipt of the confirmation signal, to restart the motion of the scanning means and to cause the first memory means to store a subsequent data block and the second control means is provided to generate the confirmation signal when the data block stored in the second memory means is error-free.

3. A device according to claim 1, wherein the first memory means and the second memory means each have a storage capacity corresponding to a large number of data blocks, the number of data blocks preferably being sufficiently large to allow simultaneous storage of the data blocks corresponding to all of the picture points of the picture;

the first control means is provided to sequentially transfer via the communications line the data blocks stored in the first memory means to the second memory means and, upon sensing the retransmission signal from the receiver, to retransmit the data block in the first memory means which correspond to the data block in the second memory means in which the second control means detected an error.

4. A device according to claim 3, wherein the second control means is provided to sequentially transfer the data blocks stored in the second memory means to the digital to analog conversion means and from the digital to analog conversion means to the picture reproduction means, and to cause uninterrupted printing of the corresponding printing points.

5. A device according to claim 1 or 4 wherein the second control means is provided to transfer the received data blocks from the second memory means to the picture reproduction means at a transfer rate less than or equal to a maximum printing rate of the reproduction means and is further provided to actuate the print drive means, moving the printing element relative to the printing surface, creating a pattern of printing points identical to the pattern in which the corresponding picture points are scanned by the scanning means.

* * * * *